Patented July 15, 1952

UNITED STATES PATENT OFFICE 2,603,643

2-AMINO-4-HYDROXY-6-POLYHYDROXY-ALKYL PTERIDINE AND METHODS OF OXIDIZING SAME

Hans Kirchensteiner, Hans Spiegelberg, and Herbert Lindlar, Basel, Switzerland, assignors to Hoffmann-La Roche Inc., Nutley, N. J., a corporation of New Jersey No Drawing. Application February 28, 1948, Serial No. 12,146. In Switzerland March 13, 1947

12 Claims. (Cl. 260—251.5)

The present invention relates to the manufacture of a pteridin derivative, more specifically of 2-amino-4-hydroxy-6-pteridyl-aldehyde, which can be represented by the formula

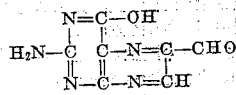

It has been found according to the present invention that 2-amino-4-hydroxy-6-pteridyl-aldehyde can be obtained by condensing, in faintly acidic solution, 2.4.5-triamino-6-hydroxy-pyrimidine with a ketohexose and subsequently oxydizing the 2-amino-4-hydroxy-6-(tetrahydroxybutyl)-pteridine which can be represented by the following formula

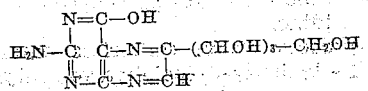

with an oxidant suitable for effecting glycolic cleavage. The condensation may be carried out in the presence of hydrazine. Potassium periodate, lead tetra acetate and red lead ($Pb_3O_4$), for instance, are suitable as oxidants.

The product thus obtained is useful as an intermediate for the preparation of folic acid.

Example 1

10 parts by weight of 2.4.5-triamino-6-hydroxy-pyrimidine-dihydrochloride, 12 parts by weight of d-fructose, 12.8 parts by weight of sodium acetate (crystallised with 3 $H_2O$) and 120 parts of water are warmed on a steam bath while carbondioxide is passed through. Within a few minutes a clear solution is formed and shortly thereafter a precipitate begins to separate. After lapse of 4½ hours, the reaction mixture is cooled, the precipitate is sucked off, successively washed with water, alcohol and ether and dried at 80° C. The yield amounts to 2 parts by weight. The crude 2-amino-4-hydroxy-6-(tetrahydroxybutyl)-pteridine thus obtained can be used as such for the preparation of 2-amino-4-hydroxy-6-pteridyl-aldehyde, as described below; if desired, it may however be purified by recrystallisation from hot water after addition of charcoal. A yellowish microcrystalline powder decomposing above 280° C. without melting is obtained.

30 parts by weight of 2-amino-4-hydroxy-6-(tetrahydroxybutyl)-pteridine are dissolved in 5000 parts by volume of 10 per cent. aqueous acetic acid. A solution of 67.5 parts by weight of lead tetra acetate in 1000 parts by volume of glacial acetic acid is added dropwise in the course of 2 hours at a temperature of 80° C. while stirring. Then an amount, equivalent to the lead salts present, of sulphuric acid, is added as well as 10 parts by weight of charcoal and stirring is continued for a short time. The hot solution is filtered and the filtrate is concentrated in vacuo to about 500 parts by volume. After cooling down the precipitate of 2-amino-4-hydroxy-6-pteridyl-aldehyde is sucked off, successively washed with water, alcohol and ether and dried at 80° C. The yield amounts to 14.2 parts by weight.

Example 2

18.8 parts by weight of 2.4.5-triamino-6-hydroxy-pyrimidine hydrochloride, 14.6 parts by weight of sodium acetate (containing 3 mols of water of crystallisation), 7 parts by weight of glacial acetic acid, 19.2 parts by weight of d-fructose and 6 parts by weight of hydrazine hydrate are heated for 7 hours in 180 parts of water on a steam bath. It was found to be advantageous to displace the air in the reaction vessel by an inert gas such as carbon dioxide or nitrogen in order to prevent oxidation of the 2.4.5-triamino-6-hydroxy-pyrimidine. At the beginning of the reaction all the solid substances gradually dissolve and later the condensation product formed separates in solid form. After cooling, the reaction mixture is filtered by suction, successively washed with water, alcohol and ether and dried at 80° C. The yield amounts to 16.3 parts by weight of 2-amino-4-hydroxy-6-(tetrahydroxybutyl)-pteridine. A pure product is obtained by dissolving the condensation product in 100 per cent. formic acid, treating the solution with charcoal and precipitating by the addition of water.

This compound is transformed into 2-amino-4-hydroxy-6-pteridyl-aldehyde, according to the indications in Example 1.

Example 3

A mixture of 321 parts by weight of 2.4.5-triamino-6-hydroxy-pyrimidine-dihydrochloride, 270 parts by weight of l-sorbose, 320 parts by weight of anhydrous sodium acetate, 270 parts by weight of glacial acetic acid, 83 parts by weight of hydrazine hydrate and 1800 parts of water is heated to 80° C. while stirring well. This results first in the formation of a complete solution and sometime later 2-amino-4-hydroxy-6-(tetrahydroxybutyl)-pteridine begins to separate. After stirring for 6 hours at the temperature indicated above the mixture is cooled down to room temperature and the crude 2-amino-4-hydroxy-6-(tetrahydroxybutyl)-pteridine (180 parts by weight) is filtered off. In order to purify the same 100 parts by weight of the crude product are dissolved in 1000 parts by weight of normal aqueous hydrochloric acid at boiling temperature, decolourised with charcoal and filtered. From the filtrate 2-amino-4-hydroxy-6-(tetrahydroxybutyl)-pteridine is precipitated by addition of a solution of 95 parts by weight of anhydrous sodium acetate in 150 parts by weight of water. Complete purification is finally brought about by recrystallisation from 100 parts of boiling water.

50 parts by weight of 2-amino-4-hydroxy-6-(tetrahydroxybutyl)-pteridine are mixed with 200 parts by volume of 3 N sulfuric acid and the mixture is stirred for ¼ hour. For the purpose of purification 5 parts by weight of a silicate adsorbant are added and stirring is continued for a further ¼ hour. The mixture is filtered by suction and 200 parts of water and 50 parts by weight of crystalline sodium periodate are added to the filtrate. After stirring for 1 hour further 200 parts of water are added to the mixture, which is then stirred further 4 hours. Subsequently, it is left to stand in an ice-box for 10 hours. The precipitate is sucked off and thoroughly washed successively with water and methanol. 25 parts by weight of crude 2-amino-4-hydroxy-6-pteridyl-aldehyde are obtained which may be purified by suspension in 70 parts of water, addition of concentrated aqueous hydrochloric acid until complete solution is obtained, addition of charcoal, filtering and addition of 600 parts of water to the filtrate while stirring. The crystals thus obtained decompose at temperatures of 280° C. and higher without melting. The compound reacts with the usual aldehyde reagents; the solution of the former in formic acid turns violet on addition of Schiff's reagent and shaking for a short time. The diphenyl-hydrazone of the aldehyde is a microcrystalline powder of orange colour and is unsoluble in the usual solvents.

*Example 4*

50 parts by weight of 2-amino-4-hydroxy-6-(tetrahydroxybutyl)-pteridine, prepared in accordance with examples 1, 2 or 3 are dissolved in 2000 parts by volume of 4 N nitric acid. 400 parts of red lead ($Pb_3O_4$) are added in small portions in the course of 120 minutes, the reaction mixture being cooled so as not to allow the temperature to rise above +25° C. Subsequently 110 parts by volume of concentrated sulfuric acid (D=1.84) and 5 parts by weight of charcoal are added and the precipitated lead sulfate is sucked off. The pH of the clear light yellow filtrate, by addition of concentrated sodium hydroxide while stirring and cooling, is set to 5 to 6, the temperature not being allowed to rise above +20° C. The 2-amino-4-hydroxy-6-pteridyl-aldehyde thus separated is sucked off, washed successively with water, methanol and ether and then dried at 80° C. The yield amounts to about 32 parts by weight.

We claim:

1. A process which comprises condensing 2,4,5-triamino-6-hydroxy-pyrimidine in faintly acidic solution with a ketohexose and oxidizing the resulting condensation production so as to produce 2-amino-4-hydroxy-6-pteridyl-aldehyde.

2. A process which comprises condensing 2,4,5-triamino-6-hydroxy-pyrimidine in faintly acidic solution with a ketohexose so as to produce 2-amino-4-hydroxy-6-(tetrahydroxybutyl)-pteridine.

3. A process which comprises oxidizing 2-amino-4-hydroxy-6-(tetrahydroxybutyl)-pteridine so as to produce 2-amino-4-hydroxy-6-pteridyl-aldehyde.

4. A process as in claim 1 in which d-fructose is employed as the ketohexose.

5. A process as in claim 1 in which l-sorbose is employed as the ketohexose.

6. A process as in claim 2 in which the condensation is carried out in the presence of hydrazine.

7. A process as in claim 1 in which the oxidation is effected by means of sodium periodate.

8. A process as in claim 1 in which the oxidation is effected by means of lead tetra acetate.

9. A process as in claim 1 in which the oxidation is effected by means of red lead ($Pb_3O_4$).

10. 2-amino-4-hydroxy-6-(tetrahydroxybutyl)-pteridine.

11. A process which comprises oxidizing 2-amino-4-hydroxy-6-(polyhydroxybutyl)-pteridine so as to produce 2-amino-4-hydroxy-6-pteridyl adlehyde.

12. 2-amino-4-hydroxy-6-polyhydroxyalkyl pteridine.

HANS KIRCHENSTEINER.
HANS SPIEGELBERG.
HERBERT LINDLAR.

REFERENCES CITED

The following references are of record in the file of this patent:

Karrer et al., Helv. Chim. Acta, 30, 1031–1036 (1947).

Weisblat et al., J. Am. Chem. Soc. 69, 2566–2567 (1947).